United States Patent [19]

Grady

[11] Patent Number: 4,744,017

[45] Date of Patent: May 10, 1988

[54] HIGH TENSION POWER SUPPLY WITH MEANS FOR PREVENTING TRANSFORMER SATURATION

[76] Inventor: John K. Grady, 43 Slough Rd., Harvard, Mass. 01451

[21] Appl. No.: 88,702

[22] Filed: Aug. 24, 1987

[51] Int. Cl.$^4$ ........................................... H02M 7/155
[52] U.S. Cl. ...................................... 363/8; 363/128; 363/157; 323/908
[58] Field of Search ................................ 363/8, 27–28, 363/50, 53, 54, 84–86, 125, 126, 128, 157; 323/908; 378/101, 104, 114, 115

[56] References Cited

U.S. PATENT DOCUMENTS

| | | | |
|---|---|---|---|
| 3,303,405 | 2/1967 | Schwarz | 363/28 |
| 3,544,913 | 12/1970 | Anderson | 363/27 X |
| 3,636,355 | 1/1972 | James et al. | 378/101 |
| 4,614,999 | 9/1986 | Onodera et al. | 363/28 |
| 4,665,476 | 5/1987 | Masuda | 363/128 |

*Primary Examiner*—Peter S. Wong
*Attorney, Agent, or Firm*—M. Lawrence Oliverio

[57] ABSTRACT

A high tension power supply for use in an x-ray tube drive circuit which uses a step-up transformer to raise an input line signal to the desired voltage level. A partially open bridge or other suitable means permits only half cycles, for example positive half cycles, of the transformer output to be applied to fire the x-ray tube. Saturation of the transformer core during unused half cycles, for example negative half cycles, is prevented by adding a compensating impedance in series with the circuit passing the unused half cycle to the transformer primary, the increased voltage drop across this impedance as current increases in response to the transformer approaching saturation reducing the voltage across the transformer so as to maintain the average voltage across the windings during both half cycles substantially equal. This achieves "constant phase" exposures without transformer saturation.

13 Claims, 1 Drawing Sheet

HIGH TENSION POWER SUPPLY WITH MEANS FOR PREVENTING TRANSFORMER SATURATION

This invention relates to high tension power supplies and more particularly to a high tension power supply adapted for use in operating an x-ray tube, which supply includes means for preventing transformer saturation.

BACKGROUND OF THE INVENTION

When an x-ray tube is being used for applications such as cardiac angiography, the x-ray tube must be operated in relatively short bursts at relatively high frequency in order to obtain clear images and to be able to monitor heart activity and detect any abnormalities. Typically, the tube would be operated in approximately 8 ms bursts at rates of 60, 30, 15, or 7.5 frames-per-second. This is especially valuable for use with television or digital imaging techniques, where the phase of the television scan is locked to the power line phase.

Since an x-ray tube typically requires in the area of 150,000 volts to be operated, a high tension power supply utilizing a step-up transformer is required to raise available AC line voltages to this level. While rectification may occur in the primary circuit of such a transformer, the phase of all of the signals being applied to the transformer being of the same polarity would result in saturation of the high tension power transformer core, preventing the power supply from producing the desired outputs.

Therefore, since, in order to achieve constant phase of the exposures, it is necessary that the half cycles on which the x-ray tube is triggered be of the same polarity, an open bridge rectifier has been employed in the secondary of the transformer in order to achieve pulses of the desired polarity and phase to trigger the tube. If triggering of the tube at less than 60 frames per second is desired, circuitry may be added to selectively pass the input pulses to the transformer in order to achieve the desired frame rate.

However, when the power supply is operated with such an open high voltage bridge, the primary circuit is under load only during the half cycle when the x-ray tube is being operated and current is being drawn in the secondary, the open bridge effectively acting as an open circuit during the other half cycle. Since there is almost no line current during the other half cycle, there is little line voltage drop during this half cycle resulting in higher average voltage levels. This results in the time integral of the voltage applied to the transformer having a net DC component in the unloaded direction (for example, in the negative direction) resulting in the transformer core saturating in this direction. As previously indicated, such saturation prevents the power supply from generating the desired output and may prevent it from generating any output.

Heretofore, problems of this type have been dealt with by using a high frequency microprocessor controlled design with a high voltage semiconductor compensated network and long down, or fall times, or with cores having air gaps to prevent saturation, or with specially designed, very expensive transformers. While in some instances these prior art systems have provided satisfactory results, such equipment has been expensive, in some instances failure prone, and the results have not always been satisfactory. A need therefore exists for a simple, inexpensive, reliable and effective means of preventing transformer saturation in a high tension power supply utilizing transformer coupling.

SUMMARY OF THE INVENTION

In accordance with the above, this invention provides a power supply for producing high voltage pulses for operating an x-ray tube which supply utilizes a high-voltage step-up transformer with primary and secondary windings, means for connecting the secondary windings to the x-ray tube, and means for generating a periodic sequence of pulses, each of said pulses consisting of a single cycle of alternating current consisting of first and second half cycles. The improvement includes means connected between the pulse generating means and the transformer primary winding for connecting the pulse generated to the primary winding during first half cycles so that an average current flow is established in the primary winding during such first half cycle and means connected between the pulse generating means and the transformer primary winding for limiting the current flow in the transformer primary winding during second half cycles so that the average voltage in the primary winding during the second half cycle is substantially equal to the average voltage during the first half cycle. The limiting means is preferably a compensating impedance connected in series with the pulse generating means and the primary transformer windings.

The foregoing other objects, features and advantages of the invention will be apparent from the following more particular description of a preferred embodiment of the invention as illustrated in the accompanying drawings.

IN THE DRAWINGS

DETAILED DESCRIPTION

Figure 1:
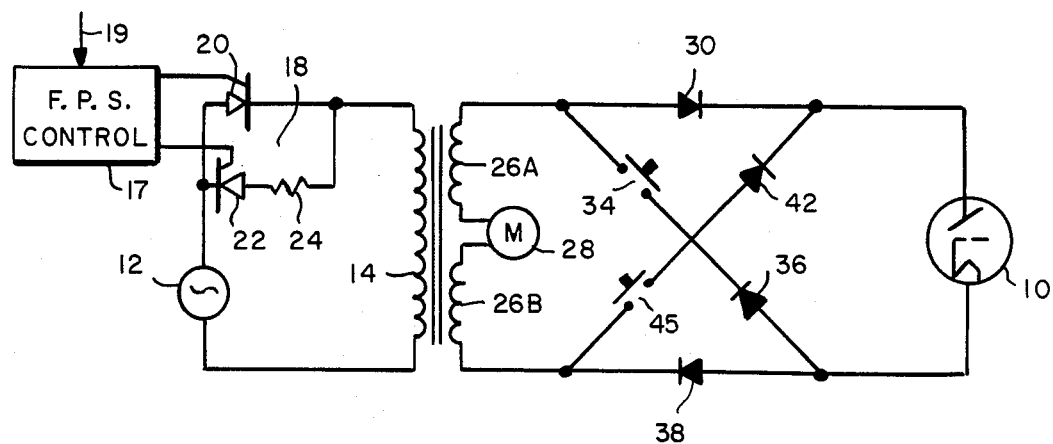
FIG. 1 is a semi-schematic circuit diagram of a high tension power supply of a preferred embodiment of the invention.

Referring to FIG. 1, a high tension power supply for operating an x-ray tube 10 in accordance with the teachings of this invention is shown. An AC signal from a low voltage source 12 which, for example, may be a 60 cps signal at 480 volts, is applied to the primary winding 14 of a transformer 16 through a silicon controlled rectifier circuit 18 under control of a frames-per-second control circuit 17.

Frames-per-second control 17 is a gating circuit which selectively passes the AC cycles from source 12 in accordance with a user controlled input 19. The function of circuit 17 will be described in greater detail in conjunction with the following description of operation.

Circuit 18 includes a forward biased rectifier 20 which passes the positive half cycle of the AC signal and a back-biased rectifier 22 which passes the negative half cycle of the AC signal through a resistor 24. Frames-per-second control 17 supplies a control input to each of the rectifiers, the rectifiers generating an output only when this input is present. Silicon controlled rectifiers 20 and 22 may be replaced by diodes in some applications.

Transformer 16 has a pair of series connected secondary windings 26A and 26B with a milliampmeter 28 connected at the junction of the two secondary windings. The secondary windings are connected through a partially open diode bridge circuit to x-ray tube 10. In particular, the outer output side of winding 26A is connected through diode 30 to the anode of tube 10. The output from winding 26A is also applied through switch 34 and diode 36 to the cathode of tube 10. Similarly, the outer output side of winding 26B is connected through backbiased diode 38 to the cathode of tube 10 and through switch 40 and diode 42 to the anode of the x-ray tube. With switches 34 and 40 closed, the bridge circuit would serve as a full wave rectifier. However, with these switches open as shown in FIG. 1, the circuit passes only the positive half cycle of each AC cycle to operate x-ray tube 10. For purposes of this invention, switches 34 and 40 may be considered to be permanently open and the two cross branches containing these switches may in fact not be present in the circuit.

Operation

Figure 2:
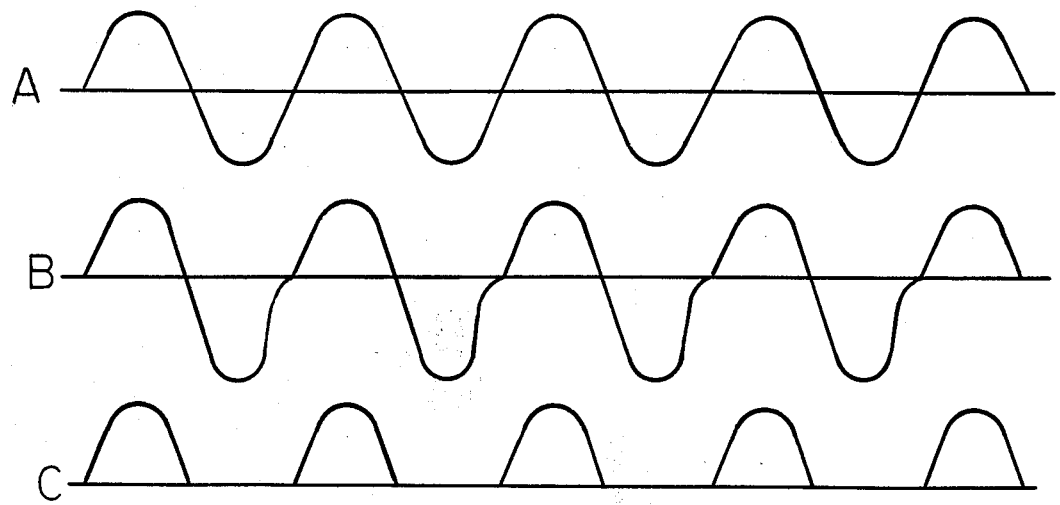
FIG. 2 is a diagram illustrating the signals appearing at various points in the circuit of FIG. 1.

Referring to FIGS. 1 and 2 together, the output from generator 12 is a standard 60 cycle AC signal as shown on line A of FIG. 2. If x-ray tube 10 is to be operated at 60 frames per second, each of the pulses shown on line A would be passed to transformer 16 to ultimately operate tube 10. If control line 19 indicates that the tube is to be operated at 30 frames per second, a standard control in circuit 17, such as a register or flip-flop controlled gate, would permit only every other one of the pulse cycles shown on line A to pass to transformer 16 and thus to tube 10, resulting in the desired output frequency. Similarly, if fifteen frames-per-second were required, circuit 17 would permit the passing of only every fourth cycle on line A, and if 7.5 frames-per-second were desired, only every eighth cycle on line A would be passed. As previously indicated, circuit 17 could be a standard flip-flop or register controlled gating circuit, the details of which do not form part of the present invention, or its function could be performed in some other suitable manner.

The positive half cycle of each cycle passes through rectifier 20 to primary winding 14 and the negative half cycle of each such cycle passes through rectifier 22 and resistor 24 to the primary winding. Transformer 16 is a step-up transformer which, for example, steps up the voltage applied to primary winding 14, which may for example be 480 volts, to 150,000 volts across windings 26A and 26B. Roughly half of this voltage would normally be developed in each of the secondary windings. Since switches 34 and 40 are open, only the positive half cycle of each AC cycle passed by frames-per-second circuit 17 is passed to the x-ray tube. The input to the x-ray tube for 60 fps operation is shown on line C of FIG. 2. Every other one of the pulses on line C would be present for 30 fps operation of tube 10, every fourth pulse present for 15 fps operation and every eighth pulse present for 7.5 fps operation.

In normal full-wave operation of the bridge, the current drawn during both the positive and negative half cycles in the secondary circuit during each AC cycle are substantially similar so that the average load on the primary winding is substantially equal during these half cycles. This results in the average voltage in the primary winding during each half cycle being substantially equal so that the transformer core does not saturate in either direction. However, with the bridge open as shown in FIG. 1, load is being drawn in the secondary circuit only during the positive half cycles, x-ray tube 10 and the open switches serving substantially as an open circuit during the negative half cycles. This results in there being substantially no current flow in the secondary circuit during negative half cycles and thus in minimal current flow in the primary. Low current flow in the primary means that there is less voltage drop across the primary circuit and power lines during the negative half cycles than during the positive half cycles, resulting in higher average voltage levels in the primary winding during the negative half cycles. Over a relatively short period of time, this results in saturation of the transformer core in the negative direction, preventing proper operation of the power supply.

In accordance with the teachings of this invention, this problem is overcome by having the resistor 24 in series with rectifier 22. As the core of transformer 16 starts to go into saturation, the impedance of the transformer drops, causing current flow through resistor 24 to increase. As the current flow through resistor 24 increases, the voltage drop across this resistor reduces the voltage across the primary winding during the negative half cycle sufficiently so that the average voltage across this winding during a full cycle of the AC signal is sufficiently low to prevent saturation of the transformer core. This circuit thus possesses a self regulating feature. An example of the signal which might appear across primary winding 14 is shown on line B of FIG. 2.

One way to select the value for resistor 24 is to note that tube 10 operates as a diode with a forward load impedance and a different, much higher, reverse load impedance (substantially an open circuit) and to select the value of resistor 24 such that its impedance is substantially equal to the difference as reflected back through the transformer of the forward and reverse x-ray load impedances. Since the reverse load impedance of the transformer is substantially infinite, the reverse load impedance reflected back through the transformer is substantially the impedance of the transformer. While suitable values for resistor 24 will vary with application, an example of a value for this resistor for a circuit having the voltage values previously discussed is approximately 2 ohms.

A simple, versatile and very inexpensive circuit has thus been provided for preventing transformer saturation in a high tension power supply. It is noted, for example, that the circuit easily adapts to variations in frames-per-second operation of the x-ray tube while keeping the phase of such exposures constant. The primary circuit is drawing no current during either half-cycle of unused cycles so that resistor 24 has no effect and the average voltage is zero.

While a resistor 24 has been shown in FIG. 1, other suitable impedance elements might be utilized in place of resistor 24 in order to achieve the desired results. It might also be desirable to make resistor 24 variable so that the circuit can be adjusted to achieve optimum results. It may also be desirable to be able to control the voltage of source 12 and/or the step up ratio of transformer 16. Thus, while the invention has been shown and described above with reference to a preferred embodiment, the foregoing and other changes in form and detail may be made therein without departing from the spirit and scope of the invention.

What is claimed is:

1. In a power supply for producing high voltage pulses for operating an x-ray tube, said supply having a high voltage step-up transformer with primary and secondary windings, means for connecting said secondary winding to an x-ray tube to be operated, and means for generating a periodic sequence of pulses, each of said pulses consisting of a single cycle of alternating current consisting of a first and a second half cycle, there being an average voltage in the primary winding for each half cycle the improvement comprising means connected between said pulse generating means and said transformer primary winding for connecting said pulse generating means to said primary winding during said first half cycle so that an average current flow is established in said primary winding during said first half cycle, and means connected between said pulse generating means and said transformer primary winding for limiting the current flow in said transformer primary winding during said second half cycle so that the average voltage in said primary winding during said second half cycle is substantially equal to the average voltage during said first half cycle.

2. In a power supply for producing high voltage pulses for operating an x-ray tube, the improvement according to claim 1 wherein said limiting means includes a compensating impedance connected in series during said second half cycle with said pulse generating means and said primary transformer windings.

3. In a power supply for producing high voltage pulses for operating an x-ray tube, the improvement according to claim 2 wherein said compensating impedance is a resistor.

4. In a power supply for producing high voltage pulses for operating an x-ray tube according to claim 2 wherein said x-ray tube operates as a diode with a forward load impedance and a different reverse load impedance, the improvement according to claim 2 wherein the magnitude of said compensating impedance is substantially equal to the difference, as reflected back through said transformer primary windings, of the forward x-ray tube load impedance and the reverse x-ray tube load impedance.

5. In a power supply for producing high voltage pulses for operating an x-ray tube, the improvement according to claim 1 wherein said connecting means is a first rectifier means connected between said pulse generating means and said transformer primary winding.

6. In a power supply for producing high voltage pulses for operating an x-ray tube, the improvement according to claim 5 wherein said limiting means includes a second rectifier means connected in series with said pulse generating means and said transformer primary winding and polarized in a direction opposite to said first rectifier means and a compensating impedance connected in series with said second rectifier means.

7. A power supply for producing high voltage pulses for operating an x-ray tube, the improvement according to claim 1 including means operative for controlling the frame rate of the x-ray tube, said means including means for selectively passing cycles from said means for generating to said transformer primary winding.

8. A high voltage power supply which operates from single-phase alternating current and produces high voltage pulses with a pulse width of less than one cycle of said alternating current for operating an x-ray tube, said supply comprising a high voltage step-up transformer with primary and secondary windings, means for connecting said secondary winding to an x-ray tube to be operated a low voltage power supply for generating a periodic sequence of pulses, each of said pulses consisting of a single cycle of alternating current consisting of a first half cycle and a second half cycle, means connected between said low voltage power supply and said transformer primary winding for connecting said pulse generator to said primary winding during one of said half cycles, and means connected between said pulse generating means and said transformer primary winding for inserting a compensating impedance in series with said pulse generating means and said transformer primary winding during the other of said half cycles.

9. A power supply according to claim 8 wherein said x-ray tube operates as a diode with a forward load impedance and a different reverse load impedance and wherein the magnitude of said compensating impedance is substantially equal to the difference, as reflected back through said transformer primary windings, of the forward x-ray tube load impedance and the reverse x-ray tube load impedance.

10. A power supply according to claim 8 wherein said connecting means is a first rectifier means connected between said pulse generating means and said transformer primary winding.

11. A power supply according to claim 10 wherein said inserting means includes a second rectifier means connected in series with said pulse generating means and said transformer primary winding and polarized in a direction opposite to said first rectifier means.

12. A power supply according to claim 8 wherein said compensating impedance is a resistor.

13. A power supply according to claim 8 including means for selectively passing cycles of said alternating current to said transformer, whereby the frame rate of the x-ray tube may be controlled.

* * * * *